United States Patent
Jang et al.

(10) Patent No.: US 10,532,664 B2
(45) Date of Patent: Jan. 14, 2020

(54) METHOD OF ESTIMATING TIME REQUIRED TO CHARGE VEHICLE AND CHARGING RESERVATION METHOD USING THE SAME

(71) Applicants: Hyundai Motor Company, Seoul (KR); Kia Motors Corporation, Seoul (KR)

(72) Inventors: Young Jin Jang, Gyeongsangbuk-do (KR); Soung Han Noh, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 249 days.

(21) Appl. No.: 15/611,848

(22) Filed: Jun. 2, 2017

(65) Prior Publication Data
US 2018/0170203 A1 Jun. 21, 2018

(30) Foreign Application Priority Data
Dec. 15, 2016 (KR) .......................... 10-2016-0172002

(51) Int. Cl.
*B60L 53/62* (2019.01)
*B60L 11/18* (2006.01)
(Continued)

(52) U.S. Cl.
CPC .......... *B60L 11/1838* (2013.01); *B60L 53/14* (2019.02); *B60L 53/60* (2019.02); *B60L 53/62* (2019.02);
(Continued)

(58) Field of Classification Search
CPC ..... H02J 7/008; B60L 11/184; B60L 11/1809; B60L 53/60; B60L 53/62
(Continued)

(56) References Cited

U.S. PATENT DOCUMENTS

| | | | | |
|---|---|---|---|---|
| 2007/0205746 A1* | 9/2007 | Iida | ...................... | H02J 7/0029 320/151 |
| 2011/0202418 A1* | 8/2011 | Kempton | .............. | B60L 53/665 705/26.1 |
| 2016/0047862 A1* | 2/2016 | Shimizu | .................... | H02J 3/00 702/63 |

FOREIGN PATENT DOCUMENTS

| | | |
|---|---|---|
| KR | 2013-0090678 A | 8/2013 |
| KR | 2014-0084369 A | 7/2014 |

* cited by examiner

*Primary Examiner* — Edward Tso
*Assistant Examiner* — Aaron Piggush
(74) *Attorney, Agent, or Firm* — Mintz Levin Cohn Ferris Glovsky and Popeo, P.C.; Peter F. Corless

(57) ABSTRACT

A method of estimating time required to charge a vehicle is provided. The method reduces an error in estimating the time required for charging due to a difference between the voltage of an external power supply unit, measured when setting a reservation for charging, and the voltage applied to an on-board charger during actual charging of a battery, and a charging reservation method using the same. The method includes detecting an input voltage to an on-board charger from an external power supply unit and estimating an input current. A charging voltage margin value is determined based on the detected input voltage and the input current and a charging setting voltage is determined by applying the charging voltage margin value to the input voltage. A time required for charging is then calculated based on the charging setting voltage, the input current, and a charging demand of a battery.

13 Claims, 3 Drawing Sheets

(51) Int. Cl.
*B60L 53/60* (2019.01)
*B60L 53/14* (2019.01)

(52) U.S. Cl.
CPC ....... *B60L 2240/80* (2013.01); *B60L 2260/58* (2013.01); *Y02T 10/7005* (2013.01); *Y02T 10/7072* (2013.01); *Y02T 90/121* (2013.01); *Y02T 90/128* (2013.01); *Y02T 90/14* (2013.01); *Y02T 90/163* (2013.01)

(58) Field of Classification Search
USPC .............................. 320/104, 109, 156, 157
See application file for complete search history.

METHOD OF ESTIMATING TIME REQUIRED TO CHARGE VEHICLE AND CHARGING RESERVATION METHOD USING THE SAME

CROSS REFERENCE TO RELATED APPLICATION

The present application claims priority of Korean Patent Application No. 10-2016-0172002 filed on Dec. 15, 2016, the entire contents of which is incorporated herein for all purposes by this reference.

BACKGROUND

Field of the Invention

The present invention relates to a method of estimating time required to charge a vehicle and a charging reservation method using the same, and, more particularly, to a method of estimating time required to charge a vehicle, capable of reducing an error in estimating the time required for charging due to a difference between the voltage of an external power supply unit, which is measured when setting a reservation for charging, and the voltage applied to an on-board charger during actual charging of a vehicle battery, and a charging reservation method using the same.

Description of the Related Art

In general, an eco-friendly vehicle, such as an electric vehicle or a plug-in hybrid vehicle, includes an on-board charger (OBC) that converts the electric power, supplied from an external power supply unit (e.g. Electric Vehicle Service Equipment (EVSE) or an In-Cable Control Box (ICCB)) to supply electric power for charging a battery, into electric power for charging the battery mounted within the vehicle.

The eco-friendly vehicle is advantageous to be charged at night (e.g., during evening house) when electric rates are typically lower. Therefore, a driver may set a reservation for charging based on a time of departure and a time zone when electric rates are lower, with the on-board charger electrically connected to the external power supply unit in advance. In the process of setting the reservation for charging, a charging start time may be determined by estimating the time required for charging based on the charging demand of the battery. To estimate the time required for charging in the related art, a method is used in which the voltage applied to an on-board charger is detected when a driver connects the connector of EVSE to the inlet of a vehicle to estimate the time required for charging by the on-board charger based on the same, or a method in which the output power of an on-board charger is measured using a pre-charge process.

However, the conventional method of estimating the time required for charging by detecting the applied voltage does not consider a load when the on-board charger is operated at full power. Accordingly, when the on-board charger is operated during actual charging, an input voltage decreases due to the load of the on-board charger to which the input voltage is applied, thus causing an error or deviation between the estimated time required for charging and the actual time required for charging. In addition, the conventional method of estimating the time required for charging by the precharge process causes an error during actual charging and requires operation of the on-board charger in the pre-charge process. Thus, the lifespan of the elements, such as the power switch, included in the on-board charger may be decreased and the control of the elements may be complex.

The foregoing is intended merely to aid in the understanding of the background of the present invention, and is not intended to mean that the present invention falls within the purview of the related art that is already known to those skilled in the art.

SUMMARY

Accordingly, the present invention provides a method of estimating time required to charge a vehicle, capable of reducing an error in the estimation of the time required for charging due to a difference between the voltage of an external power supply unit, which is measured when setting a reservation for charging, and the voltage applied to an on-board charger during actual charging of a vehicle battery, and a charging reservation method using the same.

In accordance with one aspect of the present invention, a method of estimating time required to charge a vehicle may include detecting an input voltage to an on-board charger from an external power supply unit, and estimating an input current thereto, determining a charging voltage margin value based on the detected input voltage and the input current, and determining a charging setting voltage by applying the charging voltage margin value to the detected input voltage, and calculating a time required for charging based on the charging setting voltage, the estimated input current, and a charging demand of a battery.

In the detection of an input voltage, a voltage between both ends of a capacitor shunt-connected to an input terminal of the on-board charger may be detected as the input voltage. In addition, the input voltage of the on-board charger may be detected when the on-board charger does not perform power conversion and the input current may be estimated based on a duty of a control pilot signal transmitted from the external power supply unit to the on-board charger.

In the determination of a charging voltage margin value, a type of power supply country or external power supply unit may be determined based on the detected input voltage and the estimated input current, and different charging voltage margin values may be determined based on the determined type of power supply country or external power supply unit. In addition, a pre-stored charging voltage margin value for each power supply country or external power supply unit may be selected based on the determined type of power supply country or external power supply unit.

When the external power supply unit is determined to be a household in-cable control box, the determination of a charging voltage margin value may include comparing the detected input voltage with a preset reference voltage, selecting a pre-stored charging voltage margin value for the household in-cable control box when the detected input voltage is greater than the preset reference voltage, and determining a minimum charging voltage of the on-board charger as the charging setting voltage when the detected input voltage is less than the preset reference voltage.

The determination of a charging voltage margin value may further include re-detecting the input voltage after a preset time elapses when the detected input voltage is less than the preset reference voltage, and comparing the re-detected input voltage with the reference voltage. The selection of a pre-stored charging voltage margin value for the household in-cable control box may be performed when the re-detected input voltage is greater than the reference voltage, and the determining a minimum charging voltage of the on-board charger as the charging setting voltage may be performed when the re-detected input voltage is less than the reference voltage.

In accordance with another aspect of the present invention, a vehicle charging reservation method may include receiving a time of departure of a vehicle and electric rate information for each time zone, connecting a connector of an external power supply unit to an inlet of the vehicle, and determining a charging start time based on the time required for charging calculated by the method of estimating time required to charge a vehicle, the time of departure, and the electric rate information.

In the detection of an input voltage, the input voltage of the on-board charger may be detected when the on-board charger does not perform power conversion. In addition, the input current may be estimated based on a duty of a control pilot signal transmitted from the external power supply unit to the on-board charger. In the determination of a charging voltage margin value, a type of power supply country or external power supply unit may be determined based on the detected input voltage and the estimated input current, and different charging voltage margin values may be determined based on the determined type of power supply country or external power supply unit. The vehicle charging reservation method may further include charging the battery to wake up the on-board charger at the determined charging start time to convert electric power input from the external power supply unit and to supply the converted power to the battery.

As apparent from the above description, in accordance with the method of estimating time required to charge a vehicle and the charging reservation method using the same, it may be possible to more accurately estimate the time required for charging by applying the margin that corresponds to the voltage decrease due to the load applied during actual conversion of electric power, to an input voltage based on the type of power supply country or external power supply unit, instead of simply using the voltage input from the external power supply unit to estimate the time required for charging. Thus, in accordance with the method of estimating time required to charge a vehicle and the charging reservation method using the same, it may be possible to overcome the problem that the vehicle battery is not fully charged before the set time of departure when the battery is charged with a reservation.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF PREFERRED EMBODIMENTS

Figure 1:
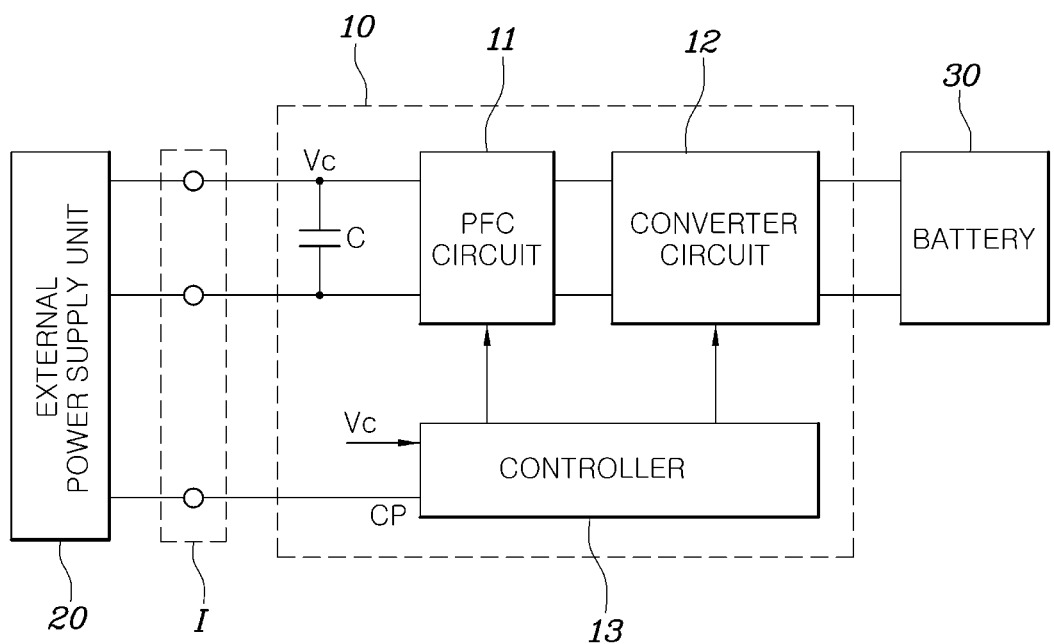
FIG. 1 is a block diagram schematically illustrating a vehicle charging system using a method of estimating time required to charge a vehicle and a charging reservation method using the same according to exemplary embodiments of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

A method of estimating time required to charge a vehicle and a charging reservation method using the same according to the exemplary embodiments of the present invention will be described below with reference to the accompanying drawings.

FIG. 1 is a block diagram schematically illustrating a vehicle charging system using a method of estimating time required to charge a vehicle and a charging reservation method using the same according to exemplary embodiments of the present invention. Referring to FIG. 1, the vehicle charging system using the method of estimating time required to charge a vehicle and the charging reservation method using the same according to an exemplary embodiment of the present invention may include an on-board charger 10 disposed within a vehicle, a battery 30, and an external power supply unit 20 configured to supply electric power for charging the battery 30 from the outside of the vehicle.

The on-board charger 10 is a power conversion device mounted within the vehicle and configured to convert the alternating current (AC) charging power input from the outside into direct current (DC) power having sufficient voltage to be applied to the battery 30. The on-board charger 10 may generally include a power factor correction (PFC) circuit 11 configured to convert AC power into DC power, a DC-DC converter circuit 12, and a controller 13 configured to operate the two circuits 11 and 12.

The PFC circuit 11 is an element configured to convert the AC voltage supplied from the external power supply unit 20 into a DC voltage to output the DC voltage and adjust the power factor of the transmitted power. For example, although the topology of a boost converter that consists of an inductor, a switching element, and a diode is applicable to the PFC circuit 11, various different topologies known in the art may also be applied thereto.

The DC-DC converter circuit 12 may be configured to convert the DC voltage input from the PFC circuit 11 into an appropriate voltage for charging the battery 30, and output the voltage to the battery 30. For example, the DC-DC converter circuit 12 may be implemented by the topology of an isolated DC-DC converter circuit that includes a transformer for electrical insulation. The controller 13 may be configured to operate the PFC circuit 11 and the DC-DC converter circuit 12. The PFC circuit 11 and the DC-DC converter circuit 12 may include switching elements for control of pulse width modulation (PWM). The controller 13 may be configured to transmit a PWM control signal, the duty of which may be adjusted, to the switching elements included in the PFC circuit 11 and the DC-DC converter circuit 12 to operate the switching elements.

In various exemplary embodiments of the present invention, the controller 13 may be configured to estimate the time required for charging to create a reservation for charging of the battery 30. The external power supply unit 20 may be configured to supply electric power to the on-board charger 10. The external power supply unit 20 may be, for example, electric vehicle service equipment (EVSE) that is provided in the station (e.g., charging station) to simultaneously charge multiple vehicles, or an in-cable control box (ICCB) configured to supply household commercial power to the vehicle. The voltage and current of the charging power supplied from the external power supply unit 20 vary based on the type of power production country or external power supply unit. Thus, it may be possible to understand the type of power production country or external power supply unit, based on the voltage and current of the charging power.

The battery 30 may be configured to store electric energy in a secondary battery. In particular, the battery 30 may be a high-voltage battery (also referred to as a main battery or a primary battery) indisposed within an electric vehicle or a plug-in hybrid vehicle to supply electric power to a motor for driving the vehicle. In FIG. 1, reference numeral "I" refers to a region in which the inlet of the vehicle is coupled to the connector of the external power supply unit 20.

Figure 2:
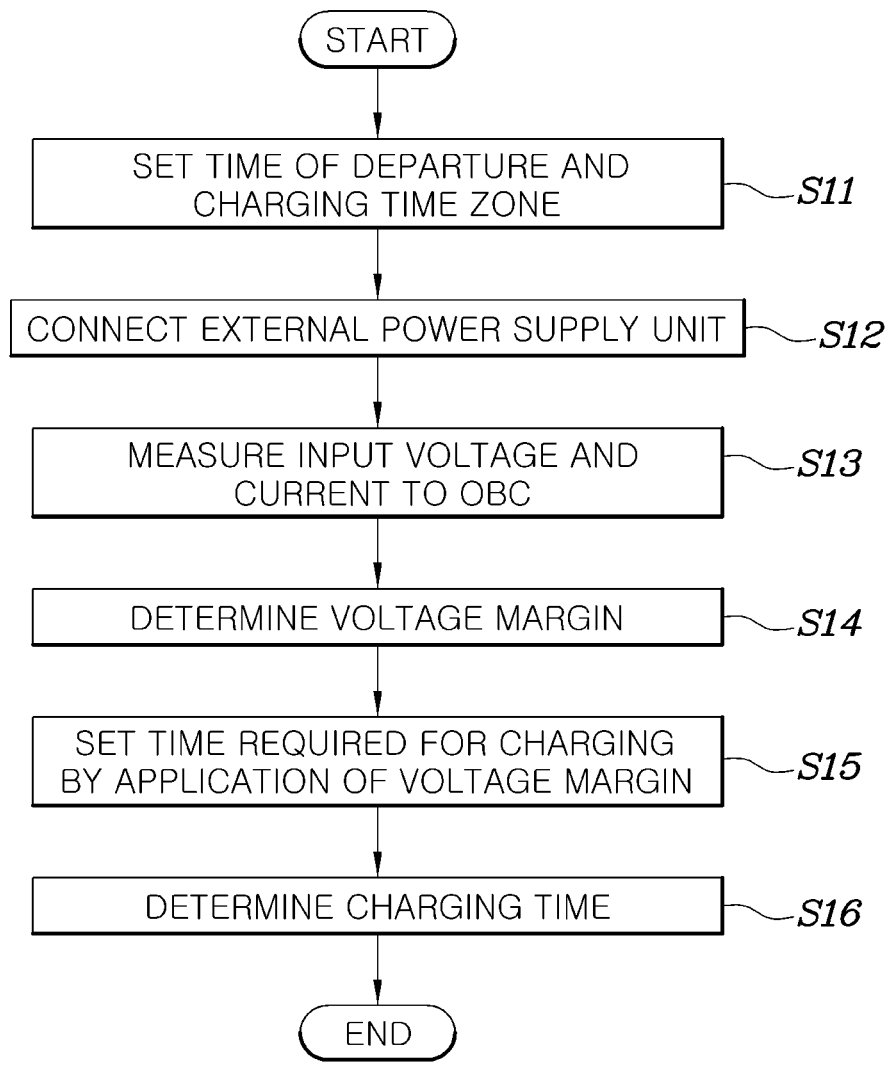
FIG. 2 is a flowchart illustrating the method of estimating time required to charge a vehicle and the charging reservation method using the same according to the exemplary embodiments of the present invention.

FIG. 2 is a flowchart illustrating the method of estimating time required to charge a vehicle and the charging reservation method using the same according to the exemplary embodiments of the present invention. Particularly, all of steps S11 to S16 illustrated in FIG. 2 correspond to the charging reservation method according to the exemplary embodiment of the present invention, and from among them, steps S12 to S15 correspond to the method of estimating time required for charging according to the exemplary embodiment of the present invention. Referring to FIG. 2, the method of estimating time required to charge a vehicle according to the exemplary embodiment of the present invention may be configured to detect an input voltage Vc to the on-board charger (OBC), supplied with electric power from the inlet of the vehicle, and estimate an input current thereto (S13), when the connector of the external power supply unit 20 is connected to the inlet (S12).

To detect the input voltage and estimate the input current, the connector of the external power supply unit 20 may be connected to the inlet of the vehicle for a charging reservation, and then the vehicle may be set to be in a charging standby state by a driver operation of a switch in step S12. In other words, when the driver operates the switch in step S12, the controller 13 of the on-board charger 10 may be configured to detect whether the connector of the external power supply unit 20 is connected to the inlet, in which case the controller may be configured to detect the charging standby state and allow the level of the charging current to be estimated in response to a control pilot (CP) signal input from the external power supply unit 20.

Particularly, the operation of the switch whereby the vehicle is set to be in the charging standby state may be used as input for paying charging rates in specific charging equipment. For example, it is not necessary to pay separate charging rates in the ICCB which is a household charger, but it is necessary to pay charging rates in the EVSE which is equipment for charging of the vehicle. Accordingly, the process of connecting the on-board charger to the EVSE and of then operating the switch by the driver may be include requesting payment for the amount of power supplied from the EVSE for charging. The control pilot signal is a signal used to adjust the charging of the vehicle and may have a pulse voltage waveform with a duty. In particular, the control pilot signal may allow charging states (e.g. a charging standby state, a charging progress state, etc.) to be detected by the pulse voltage peak value thereof, and allow the level of current input for charging to be estimated with the duty thereof. Detailed description of this control pilot signal will be omitted since its features are known in the art as international standards for vehicle charging system.

Meanwhile, in step S13, the controller 13 may be configured to detect a voltage between both ends of a capacitor C, which is shunt-connected to the input terminal of the on-board charger 10, as an input voltage Vc. For example, in response to determining that the connector of the external power supply unit 20 is connected to the inlet of the vehicle based on the user or driver operation of the switch, the controller 13 may be configured to detect the voltage between both ends of the capacitor C that is shunt-connected to the input terminal of the on-board charger 10. In particular, the controller 13 may be configured to detect the voltage between both ends of the capacitor C when the on-board charger 10 does not perform power conversion and the connector of the external power supply unit 20 is merely connected to the inlet of the vehicle.

The input voltage Vc detected in step S13 is a voltage detected in a no-load state in which the on-board charger 10 does not perform power conversion. Subsequently, in the process of charging the battery 30 by actual power supply, since a load is applied to the input terminal of the on-board charger 10, which is supplied with electric power from the external power supply unit 20, by the operation of the circuits of the on-board charger 10, a voltage having a different value from the input voltage, detected in the no-load state, may be applied to the input terminal.

A charging time may further be estimated by the input voltage Vc detected in the no-load state before actual charging, resulting in an error or deviation with an actual charging time. The exemplary embodiments of the present invention are intended to set a voltage margin in consideration of such an error in advance and to thus more accurately estimate the charging time. Further, the controller 13 may be configured to determine a charging voltage margin value based on the detected input voltage and the estimated input current (S14), and determine a charging setting voltage used to calculate the time required for charging by applying the determined charging voltage margin value to the input voltage (S15).

Figure 3:
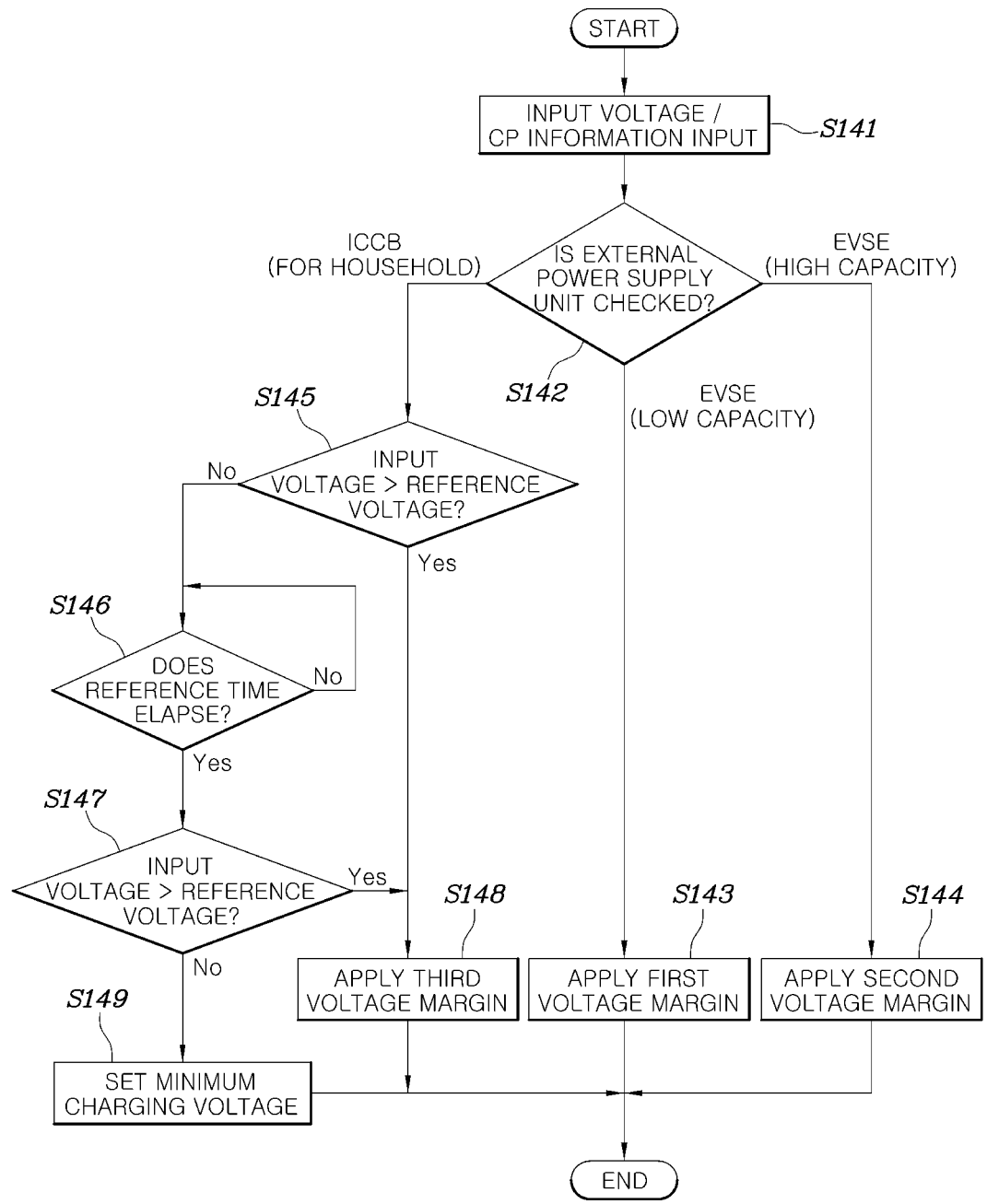
FIG. 3 is a flowchart illustrating a step of determining a charging voltage margin value in more detail in the method of estimating time required to charge a vehicle and the charging reservation method using the same according to the exemplary embodiments of the present invention.

FIG. 3 is a flowchart illustrating the determination of a charging voltage margin value in more detail in the method of estimating time required to charge a vehicle and the charging reservation method using the same according to the exemplary embodiments of the present invention. Referring to FIG. 3, when the connector of the external power supply unit 20 is connected to the vehicle and the vehicle is in the charging standby state by the driver operation of the switch, the controller 13 may be configured to estimate an input current and detect an input voltage in response to the control pilot (CP) signal input thereto (S141). Accordingly, the controller 13 may be configured to determine a type of power supply country or external power supply unit based on the input voltage and the input current (S142).

For example, in step S142, the controller 13 may be configured to determine that the external power supply unit 20 is high-capacity EVSE when the input voltage has a higher level than a household AC voltage and the level of the input current is greater than a preset value (when the duty of the control pilot signal is higher than a preset reference value). Further, the controller 13 may be configured to determine that the external power supply unit 20 is low-capacity EVSE when the input voltage has a higher level than the household AC voltage and the level of the input current is less than the preset value (when the duty of the control pilot signal is lower than the preset reference value). In addition, when the input voltage corresponds to the household AC voltage and the level of the input current is less than the reference value, used to determine EVSE, over a particular level, the controller 13 may be configured to determine that the external power supply unit 20 is an ICCB using household AC power.

Although not illustrated in the drawing, the controller 13 may further be configured to determine a power production country, based on the fact that a used system voltage value and the quality vary based on the country. Further, the controller 13 may be configured to determine different charging voltage margin values base on the determined type of power supply country or external power supply unit (S143 to S149). The controller 13 may also be configured to pre-store a charging voltage margin value for each power supply country or external power supply unit in a database of a memory, and determine a charging margin voltage by selecting the stored charging voltage margin value for each power supply country or external power supply unit based on the type of power supply country or external power supply unit determined in step S142.

For example, the controller 13 may be configured to determine a preset first voltage margin as the charging voltage margin value (S143) in response to determining that the external power supply unit 20 is low-capacity EVSE in step S142, and the controller 13 may further be configured to determine a preset second voltage margin as the charging voltage margin value (S144) in response to determining that the external power supply unit 20 is high-capacity EVSE in step S142.

Moreover, in response to determining that the external power supply unit 20 is a household ICCB in step S142, the controller 13 may be configured to compare the detected input voltage with a reference voltage (S145), without immediately determining the charging voltage margin value as in steps S143 and S144, and determine a third voltage margin that corresponds to the pre-stored ICCB as the charging voltage margin value (S148) when the input voltage is greater than the reference voltage. When the input voltage is less than or equal to the reference voltage in step S145, the controller 13 may be configured to compare the input voltage with the reference voltage again (S147) after a preset reference time period elapses (S146). When the input voltage is greater than the reference voltage in step S147, the controller 13 may be configured to determine the third voltage margin that corresponds to the pre-stored ICCB as the charging voltage margin value. When the input voltage remains less than or equal to the reference voltage in step S147, the controller 13 may be configured to set the charging setting voltage, used to estimate the time required for charging, as a minimum charging voltage (S149) without the process of setting the voltage margin.

Particularly, the third voltage margin may vary in size based on the level of the input voltage and/or the level of the input current detected in the charging standby state. The controller 13 may be configured to pre-store a data map used to determine the third voltage margin. The data map may be generated to receive the level of the input voltage and/or the level of the input current, detected in the charging standby state, and store the predetermined third voltage margin value that corresponds thereto. In other words, the memory of the controller may include a database in which the data map is stored. The controller may be configured to update the data map based on the received level of input voltage and input current.

The comparison of the input voltage with the reference voltage and the determination of the charging voltage margin value or setting the charging setting voltage as the minimum charging voltage based on the result of comparison as in steps S146 to S149 may be executed to more accurately determine the charging setting voltage by comparing the input voltage with the reference voltage two or more times, considering a possibility that household commercial power may not be smoothly supplied or proper power supply may not be temporarily performed due to variation in the quality of the household commercial power.

Further, when the charging voltage margin value is determined, the charging setting voltage may be determined by subtracting the determined charging voltage from the input voltage, and the time required for charging may be estimated in consideration of the charging setting voltage, the estimated input current, and the charging demand of the battery 30 (S15). For example, the time required for charging may be estimated by dividing the charging demand of the battery 30 by the value (corresponding to the output power of the on-board charger) obtained by multiplying the charging setting voltage with the estimated input current by efficiency of the on-board charger.

The charging reservation method according to the exemplary embodiment of the present invention may further include receiving a time of departure of a vehicle and electric rate information from a driver and setting an advantageous time zone for charging the vehicle (S11), before performing the above method of estimating time required for charging (S12 to S15). Additionally, the method may include determining a charging start time based on the time required for charging, estimated by the method of estimating time required for charging (S12 to S15), and the time zone for charging determined in step S11 (S16).

When the charging start time is determined in step S16, the controller 13 may be configured to enter a slip state and then wake up (e.g., a sleep mode may be released) at the charging start time determined in step S16 to operate the PFC circuit 11 and the DC-DC converter circuit 12, with the consequence that the controller 13 may be configured to convert the electric power input from the external power supply unit 20 to supply the converted power to the battery to charge the battery.

As described above, the method of estimating time required to charge a vehicle and the charging reservation method using the same according to the exemplary embodiments of the present invention may more accurately estimate the time required for charging by applying the margin that corresponds to the voltage decrease due to the load applied during actual conversion of electric power, to the input voltage based on the type of power supply country or external power supply unit, instead of simply using the voltage input from the external power supply unit to estimate the time required for charging as taught by the related art. Thus, the method of estimating time required to charge a vehicle and the charging reservation method using the same according to the exemplary embodiments of the present invention may overcome the problem of the related in which the vehicle battery is not fully charged before the set time of departure when the battery is charged with a reservation.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of estimating time required to charge a vehicle, comprising:
   detecting, by a controller, an input voltage to an on-board charger from an external power supply unit, and estimating an input current thereto;
   determining, by the controller, a charging voltage margin value based on the detected input voltage and the input current; and
   determining, by the controller, a charging setting voltage by applying the charging voltage margin value to the detected input voltage, and calculating a time required for charging based on the charging setting voltage, the estimated input current, and a charging demand of a battery,
   wherein the charging voltage margin value corresponds to a voltage decrease due to a load of the on-board charger applied during actual conversion of electric power by the on-board charger.

2. The method according to claim 1, wherein in the detecting of an input voltage, a voltage between both ends of a capacitor shunt-connected to an input terminal of the on-board charger is detected as the input voltage.

3. The method according to claim 1, wherein in the detecting of an input voltage, the input voltage of the on-board charger is detected when the on-board charger does not perform power conversion.

4. The method according to claim 1, wherein in the detecting of an input voltage, the input current is estimated based on a duty of a control pilot signal transmitted from the external power supply unit to the on-board charger.

5. The method according to claim 1, wherein in the determining of a charging voltage margin value, a type of power supply country or external power supply unit is determined based on the detected input voltage and the estimated input current, and different charging voltage margin values are determined based on the determined type of power supply country or external power supply unit.

6. The method according to claim 5, wherein in the determining of a charging voltage margin value, a pre-stored charging voltage margin value for each power supply country or external power supply unit is selected based on the determined type of power supply country or external power supply unit.

7. The method according to claim 5, wherein when the external power supply unit is determined to be a household in-cable control box, the determining of a charging voltage margin value includes:
   comparing, by the controller, the detected input voltage with a preset reference voltage;
   selecting, by the controller, a pre-stored charging voltage margin value for the household in-cable control box when the detected input voltage is greater than the preset reference voltage; and
   determining, by the controller, a minimum charging voltage of the on-board charger as the charging setting voltage when the detected input voltage is less than the preset reference voltage.

8. The method according to claim 7, wherein the determining of a charging voltage margin value further includes:
   re-detecting, by the controller, the input voltage after a preset time period elapses when the detected input voltage is less than the preset reference voltage; and
   comparing, by the controller, the re-detected input voltage with the reference voltage,
   wherein the selecting of a pre-stored charging voltage margin value for the household in-cable control box is performed when the re-detected input voltage is greater than the reference voltage, and
   wherein the determining of a minimum charging voltage of the on-board charger as the charging setting voltage is performed when the re-detected input voltage is less than the reference voltage.

9. A vehicle charging reservation method, comprising:
   receiving, by the controller, a time of departure of a vehicle and electric rate information for each time zone;
   connecting, by the controller, a connector of an external power supply unit to an inlet of the vehicle; and
   determining, by the controller, a charging start time based on the time required for charging calculated by the method according to claim 1, the time of departure, and the electric rate information.

10. The vehicle charging reservation method according to claim 9, wherein in the detecting of an input voltage, the input voltage of the on-board charger is detected when the on-board charger does not perform power conversion.

11. The vehicle charging reservation method according to claim 9, wherein in the detecting of an input voltage, the input current is estimated based on a duty of a control pilot signal transmitted from the external power supply unit to the on-board charger.

12. The vehicle charging reservation method according to claim 9, wherein in the determining of a charging voltage margin value, a type of power supply country or external power supply unit is determined based on the detected input voltage and the estimated input current, and different charging voltage margin values are determined based on the determined type of power supply country or external power supply unit.

13. The vehicle charging reservation method according to claim 9, further comprising:
   charging, by the controller, the battery to wake up the on-board charger at the determined charging start time to convert electric power input from the external power supply unit and to supply the converted power to the battery.

\* \* \* \* \*